(12) United States Patent
Chew

(10) Patent No.: US 8,241,597 B2
(45) Date of Patent: Aug. 14, 2012

(54) METHOD AND SYSTEM FOR REMOVING POLLUTANTS AND GREENHOUSE GASES FROM A FLUE GAS

(75) Inventor: Hwee Hong Chew, Kowloon (HK)

(73) Assignee: Ecospec Global Technology Pte. Ltd., Singapore (SG)

( * ) Notice: Subject to any disclaimer, the term of this patent is extended or adjusted under 35 U.S.C. 154(b) by 0 days.

(21) Appl. No.: 13/260,311

(22) PCT Filed: Jun. 3, 2009

(86) PCT No.: PCT/CN2009/072110
§ 371 (c)(1),
(2), (4) Date: Sep. 25, 2011

(87) PCT Pub. No.: WO2010/139114
PCT Pub. Date: Dec. 9, 2010

(65) Prior Publication Data
US 2012/0121489 A1      May 17, 2012

(51) Int. Cl.
*B01D 53/50* (2006.01)
*B01D 53/56* (2006.01)
*B01D 53/62* (2006.01)
*B01D 53/78* (2006.01)

(52) U.S. Cl. .......... 423/210; 423/243.01; 423/235; 423/220; 422/168; 422/169; 422/170

(58) Field of Classification Search .......... 423/210, 423/243.01, 235, 220; 422/168, 169, 170
See application file for complete search history.

(56) References Cited

U.S. PATENT DOCUMENTS 5,141,727 A * 8/1992 Varney .......... 423/243.01

FOREIGN PATENT DOCUMENTS

WO     WO 03-082445 A1 * 10/2003

* cited by examiner

*Primary Examiner* — Timothy Vanoy
(74) *Attorney, Agent, or Firm* — Wendy K. Marsh

(57) ABSTRACT

A system and method for removing pollutants and greenhouse gases $SO_2$, $NO_2$, and $CO_2$ from a flue gas stream, includes: a) contacting natural seawater with a flue gas for a given period of time to remove $SO_2$ from the flue gas; b) contacting treated alkaline water to the flue gas to remove $CO_2$ and $NO_x$ from the flue gas and generate oxygen and carbon particles; and c) collecting or emitting the flue gas after step b). The method and the system of the invention are significantly more economical and convenient and do not cause harm to the environments. The invention also exhibits a novel and unique feature that elemental carbon and oxygen are generated as final products and can be recovered as an energy source.

20 Claims, 1 Drawing Sheet

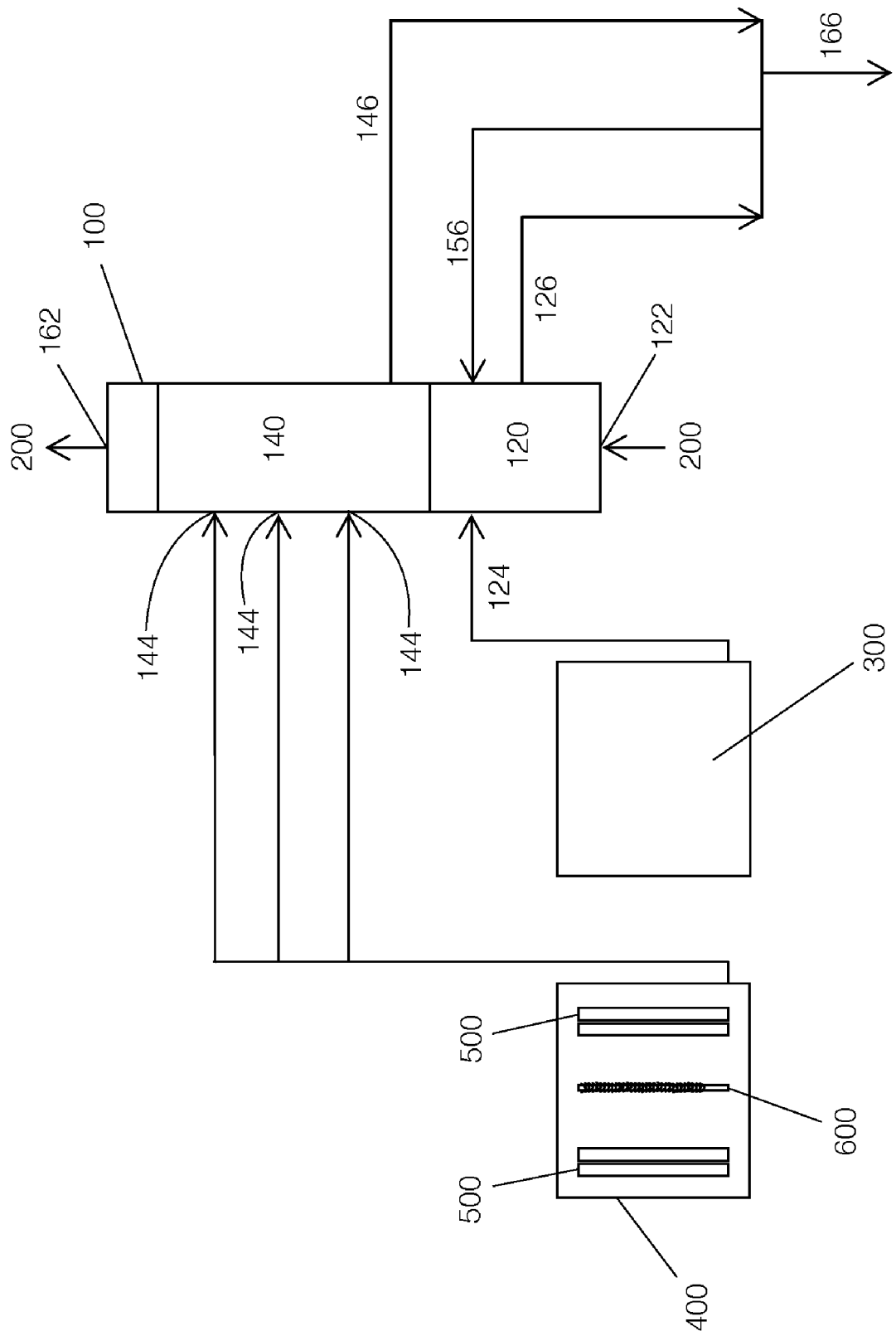

METHOD AND SYSTEM FOR REMOVING POLLUTANTS AND GREENHOUSE GASES FROM A FLUE GAS

CROSS-REFERENCE TO RELATED APPLICATIONS

This national phase entry application filed under 35 USC §371 claims priority to international patent application PCT/CN2009/072110 filed on Jun. 3, 2009, which is incorporated by reference herein.

FIELD OF THE INVENTION

The present invention relates to a method and a system for removing pollutants and greenhouse gases, and more particularly, to a method and a system for simultaneously removing pollutants and greenhouse gases such as $SO_2$, $NO_x$, and $CO_2$ from a flue gas through a combined effect of adsorption, bond breaking end result alike reaction and time varying low frequency electromagnetic wave treatment.

BACKGROUND OF THE INVENTION

In many industries including onshore, offshore industries, land, sea and air transportation, a flue gas containing pollutants and greenhouse gases such as $SO_2$, $NO_x$ and $CO_2$ is usually generated and needs to be treated to comply with the emission standards requisitioned by various environmental authorities and international organization.

Presently, control measures for removing $SO_2$, $NO_x$ and $CO_2$ from the flue gas are discussed as follows.

To reduce $SO_2$ emission, the approaches in existence are typically to use low sulfur fuel if $SO_2$ is generated from the combustion of oils. However, the use of these approaches would be hindered due to the high cost of low sulfur fuel premium and the availability of low sulfur fuel. Lime or seawater scrubbing processes are used to reduce the $SO_2$ emission if $SO_2$ is generated from the combustion of coal and other combustion processes. However, the use of lime in a dry or wet environment would lead to generation of $CO_2$, because the lime CaO is typically obtained by heating limestone $CaCO_3$ which results in releasing $CO_2$. That is, using the lime processes to remove $SO_2$ is in fact an exchange for $CO_2$ generation. In the case of using the seawater scubbing processes to remove $SO_2$, sulfuric acid is produced due to the reaction of $SO_2$ and water. Typically the scrubbed water has a pH ranging from 2-4, and as a result, would acidify the ocean and release $CO_2$ from bicarbonates and carbonates commonly present in seawater. The above processes are therefore harmful to the atmosphere and marine environments, although they all are able to remove the pollutant $SO_2$.

There have already been many low $NO_x$ engines and burners to reduce $NO_x$ emission. These low $NO_x$ combustion devices all have a common disadvantage of compromising their combustion efficiencies due to the use of a lower combustion temperature. However, the reduction in the combustion efficiency would require more fuel consumption or emit more $CO_2$. Also, there are Selective Catalytic Reduction processes (SCR) and Selective Non-Catalytic Reduction processes (SNCR) for removing $NO_x$ in which urea or amine is used to reduce NO to nitrogen gas which is an environmental friendly gas. However, the performance of the catalysts may be affected by sulfur present in fuel oil or coal. While in scrubbing processes in which lime is used, the generation of $CaSO_4$ would also cause inactivation of the surface of the catalysts, in turn affect the removal of $NO_x$.

Nowadays, the processes adapted for removing $CO_2$ are to capture $CO_2$ by chemicals such as monoethanolamine (MEA). However, these processes suffer from a serious problem that the storage for $CO_2$ needs to be solved. It is recognized that $CO_2$ emission is in the order of trillion tons annually, and storing such a huge amount of the gas $CO_2$ is costly and problematic. Also, use of chemical neutralization and absorption has been proposed from removal of $CO_2$, but disposal of final products from these processes is a crucial issue. Therefore, they cannot be considered to be a solution against the removal of $CO_2$.

One system and process for removing the pollutants and greenhouse gases have been proposed in the Japanese paper of Sukeon A N and Osami Nishida, titled "*Electrolyzed Seawater in air pollution control of marine diesel engine*" (JSME Int J Ser B (Jpn Soc Mech Eng) VOL.46; No. 1; Page 206-213 (2003)). This process is similar to the conventional processes which use alkali chemicals for scrubbing, but differs in that NaOH is produced by electrolyzing the seawater rather than added in as a ready-made NaOH chemical. However, this process is accompanied by generation of chlorine gas and HCl which are not allowed to be discharged directly by many regulations such as International Maritime Organization (IMO). In the process of this paper, the electrically produced NaOH is used to neutralize $SO_2$, $NO_x$ and $CO_2$, and acidic seawater of pH 3-5 is produced to oxidize NO to $NO_2$, allowing it to react with NaOH to convert into nitrate. Again, at such low pH acidic level, carbonates and bicarbonates in the seawater would release $CO_2$, that is, the reduction of $SO_2$ and $NO_2$ is an exchange of generation of $CO_2$. In this process, $CO_2$ is absorbed and converted into bicarbonate and carbonate in the electrolysis process. Essentially, this Japanese paper aims to remove all the three gases by converting $SO_2$ into sulphate, converting $NO_x$ into nitrate, and converting $CO_2$ into bicarbonate and carbonate. The products sulphate, nitrate, bicarbonate and carbonate would be discharged into the sea. Here the questions come. If nitrate produced is all discharged into the sea, the nitrate concentration would exceed the discharge limit of 60 ppm required by IMO, in light of the contents of $NO_x$ present in the flue gas. In addition, the conversion of $CO_2$ into bicarbonate and carbonate requires the electrolysis of seawater to increase the pH of the seawater to 10, during which the content of OH ions is typically increased by about 100 ppm or 100 grams per ton of seawater. In other words, to neutralize one ton of $CO_2$, about 386 Kg or 386,000 gm of OH ions are required in the case of a 100% neutralization of $CO_2$. The pH 10 alkaline seawater to be produced by the electrolysis will then be 3860 tons. It would be obvious that such a process for removing $CO_2$ is impractical due to the consumption of such high volume of alkaline water and energy as well as the huge size of an electrolytic tank.

Moreover, the pollutants and greenhouse gases $SO_2$, $NO_x$ and $CO_2$ are all produced and mixed together in the flue gas, and all are demanded to be removed before the flue gas is emitted. However, the above processes and systems are either intended for removing one of the pollutants and greenhouse gases, or are not a practical solution. If all these gases are to be removed together by the respective processes, installation of three different treatment plants will be required for the removal of all three gases. This inevitably results in high capital cost, substantial footprint of the three separate plants, large storage space, and high cost of reagents, in additional to the issues of storage and disposal of final products.

The processes and systems mentioned above also show that none of them is able to re-utilize $CO_2$ or final products as an energy source and they all relate to abetment technologies but not energy recovery technologies.

The invention provides a method and a system that are capable of simultaneously removing the pollutants and greenhouse gases from a flue gas at low cost, without causing a harm to the atmosphere and marine environments and without the need of consideration of disposal of final products and storage of raw reagents. Instead, the invention utilizes the final products to recover the energy involved, which has not been taught and suggested by any of the prior art reference documents.

SUMMARY OF THE INVENTION

The present invention has been developed to fulfill the needs noted above and therefore has a principle object of the provision of a method and a system for simultaneously removing the pollutants and greenhouse gases from a flue gas, which do not cause harm to the environments.

Another object of the invention is to provide a method and a system for simultaneously removing the pollutants and greenhouse gases from a flue gas which is significantly more economical and convenient than the processes and systems in the prior art.

A yet further object of the invention is to provide a method and a system for simultaneously removing the pollutants and greenhouse gases from a flue gas, which is able to recover energy from the final products.

These and other objects and advantages of the invention are satisfied by providing a method for removing pollutants and greenhouse gases $SO_2$, $NO_x$, and $CO_2$ from a flue gas stream, comprising the steps of:

a) contacting natural seawater with a flue gas in a counter flow, co-current flow or cross flow direction for a given period of time to remove $SO_2$ from the flue gas;

b) contacting treated alkaline water to the flue gas in a counter flow, co-current flow, or cross flow direction to remove $CO_2$ and $NO_x$ from the flue gas and generate oxygen and carbon particles; and c) collecting or emitting the flue gas after step b).

In one preferred embodiment of the invention, step a) is controlled to allow the seawater to come into contact with the flue gas for a duration of 1-90 seconds. In step a), the seawater after contacting with the flue gas is controlled to have a pH range of 6.0 to 7.5, so that the pH would not exceed the desired discharge control limit. While the flue gas entering step b) is controlled to be less than 70° C.

The term "treated alkaline water" herein is specifically prepared, for example, according to the method described in the following paragraphs. The details of the "treated alkaline water" have been elaborated in the co-pending PCT application no. PCT/CN2009/070422, the disclosure of which is incorporated herein by reference in its entirety.

The treated alkaline water of the invention is prepared by an alkaline water generator which makes use of a water source selected from the group consisting of tap water, river water, well water, sea water and industrial wastewater in the absence of chemicals.

In particular, the alkaline water generator works on the basis of a principle of water electrolysis, i.e. applying a direct current across two electrodes placed in an electrolytic tank. The electrode connected to a positive pole of the power source is called "anode electrode"; while the electrode connected to a negative pole of the power source is called "cathode electrode". When the power is on, positive ions ($H^+$) would migrate to the cathode electrode, and the negative ions ($OH^-$) would migrate to the anode electrode. Generally, the anode and the cathode electrodes generate oxygen for freshwater, chlorine for seawater and hydrogen respectively at a same speed, thus the pH of water remains unchanged.

In order to produce alkaline water, the speed of reducing the hydrogen ions through hydrogen generation should be fast enough to create an excess of $OH^-$ in the water hence raising the pH level of the water. This can be accomplished by altering a surface area of the electrodes, altering a current density of the electrodes, and/or utilizing an ion diaphragm between the electrodes.

It is known that the area of surface of an electrode is inversely proportional to the electric charge density of the electrode. In the alkaline water generator of the invention, the area of surface of the cathode electrode is decreased so as to increase the current density of this electrode. The increase in the current density of the cathode electrode would cause the hydrogen generation faster. In this way, hydrogen ion ($H^+$) in the water would be reduced to yield treated alkaline water of increased pH.

Yet another way to increase the pH of the treated alkaline water, an electrically conductive substance such as active carbon is added into the alkaline water generator of the invention. Because of the electrical conductivity of the substance, the oxygen or chlorine generation on the anode electrode would be impeded when the electrically conductive substance surrounds the anode electrode. As a result, the treated alkaline water can reach a higher pH value. As an alternative, an ion membrane or a non ionic physical porous separator or a diaphragm can be arranged between the electrodes to block the migration of $OH^-$ to the anode electrode, such that the pH of water in the vicinity of the cathode electrode is increased.

The treated alkaline water preferably is electrolytically prepared from a water source selected from the group consisting of sea water, underground water, river water, estuary water, rain water, industrial water and deionized water.

It has been found that the treated alkaline water, when being subject to a time varying low frequency electromagnetic wave treatment, would facilitate the removal of the pollutants and greenhouse gas from the flue gas. The details of the time varying low frequency electromagnetic wave treatment have been described in the co-pending PCT application no. PCT/SG2006/000218, the disclosure of which is incorporated herein by reference in its entirety.

The recovering of the carbon particles and oxygen generated in step b) would be performed after step b).

If necessary, steps a) and b) of the method can be repeated for one or more times.

Another aspect of the invention is to provide a system for removing pollutants and greenhouse gases $SO_2$, $NO_x$, and $CO_2$ from a flue gas stream, comprising:

a reactor configured to have at least two stages for removing the pollutants and greenhouse gases from the flue gas, wherein a first stage of the stages includes a first gas inlet for introducing the flue gas to pass upward and through the reactor, and at least one first intake for introducing natural seawater to come into contact with the flue gas in a counter flow direction to remove $SO_2$ from the flue gas; and a second stage of the stages includes at least one second intake for introducing treated alkaline water to the flue gas rising upward from the first stage in a counter flow direction to remove $CO_2$ and $NO_x$ from the flue gas and generate oxygen and carbon particles.

To properly control the contact time between the seawater and the flue gas, one or more sub-stages may be added in the first stage in order for enhancing the removing of $SO_2$. Generally, the first stage has a height range of 0.8 m-2 m, preferably 1 m-1.5 m, to allow the seawater to come into contact with the flue gas for a given period of time so that a temperature of the flue gas is decreased to less than 70° C. before the flue gas enters the second stage.

In one preferred embodiment of the invention, an alkaline water generator is used to electrolytically prepare the treated alkaline water, which is supplied to the second stage of the reactor through pipelines connecting the alkaline water generator to the second stage. Advantageously, a device for generating a time varying low frequency electromagnetic field is in combination with the alkaline water generator such that the treated alkaline water is subjected to a time varying low frequency electromagnetic wave treatment before the treated alkaline water is introduced into the second stage of the reactor.

The reactor may be configured to comprise a third stage where natural water is used to flush out the carbon particles present in the flue gas after the second stage. Also, a drift eliminator or demister may be provided at or after the third stage to remove fine water droplets to produce a final clean gas.

According to the invention, all the stages of the reactor may be provided in a single reactor or constructed as separate vessels of the reactor.

In contrast to the processes and systems available in the prior art, the method and the system of the invention are capable of removing all the three gases simultaneously, which significantly reduces the size of systems and the capital cost. In the invention, the gases in the second stage of the reactor are mainly reduced to their respective elemental states, although minor direct neutralization and absorption reactions take place. Moreover, the discharge water obtained from the invention would not affect the ecological system, and there are no need for disposal of final products and considering storage of raw reagents.

The most advantage of the invention is the generation of elemental products including elemental carbon and oxygen which can be recovered and reused again for combustion. This improves drastically the energy production efficiency for any carbon-based fuels. With such a recovery of energy, all carbonate-based substances such as minerals, limestone, dolomites or the like, including bicarbonates and carbonates present in the seawater or freshwater can be treated as an energy source. When their carbonate contents are converted into $CO_2$ by acid treatment, the gas $CO_2$ produced is then passing through the reactor to for conversion into elemental carbon and oxygen.

The objects, characteristics, advantages and technical effects of the invention will be further elaborated in the following description of the concepts and structures of the invention with reference to the accompanying drawings. The drawings illustrate the invention by way of examples without limitation to the invention in any manner.

BRIEF DESCRIPTION OF THE DRAWINGS

FIG. 1 is a schematic diagram showing an embodiment of a system that includes a two stage reactor for removing the pollutants and greenhouse gases from the flue gas.

DETAILED DESCRIPTION OF THE INVENTION

While this invention is illustrated and described in preferred embodiments, the invention may be produced in many different configurations, sizes, forms and materials.

Referring now to the drawings, FIG. 1 illustrates a system constructed consistent with a preferred embodiment of the present invention. In this embodiment, the system has a reactor 100 including two stages. However, it is possible to include more stages in the reactor without departing from the scope or spirit of the present invention.

As shown in FIG. 1, the reactor 100 is configured to have a first stage 120 located at its bottom and a second stage 140 above the first stage 120. A flue gas 200 enters the first stage 120 via a first gas inlet 122 located at the bottom of the reactor 100 and passes upward and through the second stage 140 to exit via an gas outlet 162 on the top of the reactor 100.

The first stage 120 has at least two essential functions, one is to remove $SO_2$ by absorption, the other is to control the temperature of the flue gas for the second stage and to control the pH of the seawater to be discharged (referred to "wash water" herein) from the first stage. If the temperature of the flue gas after the first stage is too high, the efficiency of the second stage would be affected. Multiple of sub-stages may be provided for the first stage in the case of the higher temperature of the flue gas, or the height of the first stage is reduced in the case that too acidic wash water is produced.

Typically, the pH of the wash water 122 from the first stage is in the range of 6.0-7.5, preferably not be less than 6.5, and can be controlled by the contact time between the flue gas and the natural seawater. If the contact time is too long, the pH of the wash water 122 would get too acidic and thus exceed the required discharge control limit by the Regulations. Therefore, the contact time needs to be controlled by, for example, the height of the first stage. In one preferred embodiment, the contact time is controlled to be 1-90 seconds, preferably 15-60 seconds, by the height range of 0.8 m-2 m for the first stage 120. By restricting the height of the first stage, one or more sub-stages in which the contact time is maintained can be added if the removal of $SO_2$ is found to be inadequate. This would not increase the contact time between the natural seawater and the flue gas while increasing the removal of $SO_2$ and maintaining the pH of the wash water 122 to be in the range of 6.0-7.5.

The flue gas entering the first stage 120 is a combustion product typically containing $SO_2$, $NO_x$ and $CO_2$ and has a temperature ranging from 100° C.-500° C. The first stage 120 is configured to have a first water intake 124 for introducing natural seawater stored in a seawater tank 300 into the first stage. The first water intake 124 is a selected type of nozzle or other suitable type of nozzle which produces the desirable mist pattern, such as a spiral screen type nozzle for allowing the seawater to be atomized in the first stage and sprayed downward to come into contact with the flue gas rising upward from the first gas inlet 122. In preferred embodiment, the first stage 120 has a height of 1 m-1.5 m, which allows for the sufficient contact time to reduce the temperature of the flue gas from 500° C. to less than 70° C. In this embodiment, the flue gas is contacted with the natural seawater in a counter flow direction. It would be noted that the natural seawater can be injected in a co-current flow or cross flow direction relative to the flow of the flue gas.

It is known that $SO_2$ has the most acid strength among the gases $SO_2$, $NO_x$ and $CO_2$. Therefore, with the arrangement of the first stage 120, the majority of $SO_2$ in the flue gas can be first absorbed by the natural seawater under the control of pH of the wash water 122 and the control of the temperature of the flue gas in the first stage as above. Here, $SO_2$ is converted into sulfuric acid according to the following reaction:

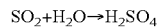

$$SO_2 + H_2O \rightarrow H_2SO_4$$

It has been found that no substantial amount of $NO_x$ and $CO_2$ would be removed from the flue gas passing upward to the second stage, if the pH of the wash water of the first stage is maintained to be higher than 5. In the first stage, a trace amount of $CO_2$ is dissolved in the vaporized water which would be transferred to the second stage rather than be emitted to the atmosphere. This eliminates the emission of $CO_2$ during the removal of $SO_2$ as it is found in the conventional processes using seawater scrubbing or lime.

The results revealed that $SO_2$ can be removed by about 98% in the first stage 120 of the reactor where the natural seawater is used to absorb $SO_2$.

The second stage 140 is configured to remove $NO_x$ and $CO_2$ from the flue gas. Likewise, the second stage 140 has various second water intakes 144 for introducing the treated alkaline water into the second stage. The second water intakes 144 are at different levels and also a selected type of nozzles or other suitable type of nozzles which produce the desirable mist pattern, such as spiral screen type nozzles for allowing the treated alkaline water to be atomized in the second stage and flow downward. The treated alkaline water is supplied from an alkaline seawater tank 400 in which one or more alkaline water generators 500 are arranged to electrolytically prepare the treated alkaline water. In this embodiment, the flue gas is contacted with the treated alkaline water in a counter flow direction. It would be noted that the treated alkaline water can be injected in a co-current flow or cross flow direction relative to the flow of the flue gas.

As mentioned above, the temperature of the flue gas entering the second stage should be lowered and preferably less than 70° C. This flue gas contains $CO_2$ and $NO_x$ as well as a trace amount of $SO_2$ or does not contain $SO_2$ because of its removal in the first stage 120.

It is surprisingly observed that the treated alkaline water, after being subjected to a treatment of time varying low frequency electromagnetic field, would greatly increase the removal of $CO_2$ and $NO_x$. Therefore, a device 600 for generating an electromagnetic field which has a varying low frequency is placed in the alkaline water tank 400 to energize the treated alkaline water. In this embodiment, the device 600 consists of a coil wrapped around a piece of pipe. The coil is connected to a separate panel from the alkaline water generators 500 for treating the treated alkaline water by applying a time varying low frequency electromagnetic field to the water surrounding the device. The details of the device 600 may make reference to the PCT application no. PCT/SG2006/000218. The energized treated alkaline water is sprayed into fine mists from the second water intakes 144 to mix with the flue gas rising upward from the first stage 120.

In the second stage, the gases $NO_x$ and $CO_2$ are found to be both reduced drastically with the generation of fine carbon particles and oxygen. The results revealed that NO and $NO_2$ can be reduced by up to 95% and $CO_2$ can be reduced by up to 80%. Also, it was interesting that the reduction of a percentage by volume of $NO_x$ and $CO_2$ is always accompanied with the generation of a percentage by volume of oxygen, and the ratio of the reduction in $NO_x$ and $CO_2$ to the generation of $O_2$ was approximately 1:1.5. In addition, a large quantity of very fine carbon particles was found in the wash water 146 of the second stage and in the flue gas after the second stage which becomes brownish due to the presence of the carbon particles.

Another finding in the second stage is that the temperature drop of the flue gas is less than 5° C., accordingly, the temperature of the treated alkaline water should have increased by less than 0.25° C.; however, the actual temperature of the water in the second stage was detected to rise by about 5° C. This suggests that the reactions occurring in the second stage are exothermic. In addition, the nitrate and nitrite dissolved in the wash water 146 of the second stage are less than 3 ppm.

With the above findings, it is strongly believed that the reactions in the second stage are bond breaking end result alike reactions accompanied with a small amount of acid-base neutralization reactions. That is, the main chemical reactions in the second stage occur as follows:

$$CO_2 + H_2O \rightarrow H_2CO_3$$

$$CO_2 \rightarrow C + O_2$$

$$NO_x + H_2O \rightarrow HNO_3$$

$$NO_x \rightarrow N_2 + O_2$$

The term "bond breaking end result alike reaction" herein refers to the reactions in which there are side reactions with the result of reducing $CO_2$ to elemental carbon and oxygen.

In a preferred embodiment of the invention, removal of 100 Kg of $CO_2$ requires 12 tons of the treated alkaline water having pH 9.5-10. In the case that the treated alkaline water having a pH of about 9.6, the pH of the wash water 146 in the second stage 140 is about 9, and the total alkalinity of the wash water in the second stage 140 substantially remains the same as the treated alkaline water entering the second stage 140, which is very close to the alkalinity of the seawater. The wash water 146 from the second stage 140 would be mixed with the slightly acidic wash water 126 from the first stage 120 to result in discharge water having a pH that is typically 8 or more. As mentioned above, the nitrate and nitrite contents in the wash water 146 of the second stage are less than 3 ppm. Hence, the discharge water of the invention would not affect the ecological system and satisfies the discharge requirement for Poly Aromatic Hydrocarbon PAH, which is less than 1 ppb. The discharge water 166 of the invention thus can be discharged directly. Alternatively, the resultant mixture of the wash water 126 of the first stage and the wash water 146 of the second stage can be re-circulated back to step a) as a source of water 156 to contact with the flue gas for removing $SO_2$. This can save the energy required for pumping the natural seawater to the first stage from the seawater tank 300.

It is obvious that the invention is characterized in that $NO_x$ and $CO_2$ are removed by bond-breaking end result alike reactions rather than by neutralization, because there is almost no nitrate found in the wash water of the second stage and a large quantity of fine carbon particles are found in the wash water and the flue gas treated after the second stage.

In the conventional neutralization processes for removing $NO_x$, the most difficult thing is to remove NO which needs to be oxidized to give $NO_2$ and then $N_2O_5$, allowing for the neutralization with alkaline to produce nitrate. While according to the invention, only the treated alkaline water, which is energized by the time varying low frequency electromagnetic wave treatment, is introduced into the second stage of the reactor to come into contact with the flue gas, and the wash water 146 is found to have a pH of about 9. This suggests that the second stage 2 is a completely alkaline environment. In this case, oxidization of NO cannot take place. That is, the neutralization reaction is not utilized for removing the gases NO and $NO_2$ present in the flue gas in the present invention.

In the conventional neutralization processes, for example, using NaOH for removing $CO_2$, a large amount of NaOH is required and the disposal of the final products is also an issue. While according to the invention, the majority of the gas $CO_2$ is converted into elemental carbon and oxygen by bond-breaking end result alike reactions, although a small portion of $CO_2$ is absorbed by the treated alkaline water. Therefore, no chemical is used and the disposal of the final products does not exist in the invention. The absorption of $CO_2$ by the treated alkaline water gives bicarbonates and carbonates in the wash water 146, the contents of which are far less than the contents of bicarbonates and carbonates produced in the conventional neutralization processes. More importantly, the final products of the invention, carbon and oxygen, can be recovered. For example, the carbon particles in the wash water may be filtered off and the fine carbon in the gas may be recovered by an electrostatic precipitator.

To provide better convenience of recovering the generated carbon particles and oxygen in the second stage, a third stage (not shown) may be added after the second stage 140 of the reactor. The third stage can also be used for removing the residual $SO_2$ in the flue gas. Specifically, the third stage can be configured to receive natural water to flush out the carbon particles from the flue gas rising upward from the second stage 140 by physical contact action to wash down the carbon particles. Then the wash water coming from the third stage, which contains a portion of carbon particles, can be mixed with the wash water 146 from the second stage 140, and the mixed wash water as such is subsequently filtered to recover the carbon particles.

The three stages of the reactor can be provided in a single reactor as shown in FIG. 1. Alternatively, separate vessels arranged in horizontal relation, each dedicated to a specific stage or set of stages, may be used. It is also possible to dedicate a single vessel to a single stage, while another vessel is dedicated to more than one of the stages. Moreover, a drift eliminator or demister may be installed at or after the third stage to remove any fine water droplets to produce a final clean gas exiting from the gas outlet 162.

According to the invention, the reactor is generally in an alkaline environment, although the first stage 120 of the reactor is under a very weak acidic condition. Therefore, there is no need to use expensive materials having high corrosion resistance for making the reactor 100 of the invention. Instead, the reactor 100 can be made of a much less expensive material such as conventional mild steel, which significantly reduces the costs of the reactor.

As discussed above, the removal of $CO_2$ is accompanied with the generation of oxygen and fine carbon particles. Based on the method of the invention, the gas $CO_2$ which occurs naturally or is produced chemically, or carbonate-based compounds such as minerals, limestone, dolomites and the like can serve as an energy source to recover oxygen and carbon. For example, if carbonate minerals are taken as an energy source, then seawater may be electrolyzed by a separator such as membrane. The acid produced electrolytically can be used to treat the carbonate minerals to generate $CO_2$, which is then treated by the method of the invention to recover carbon and oxygen. And if concentrated $CO_2$ is obtained from the $CO_2$ capturing methods such as amine method, then high contents of carbon and oxygen would be obtained by the method of the invention.

EXAMPLE

In various tests, the system shown in FIG. 1 is used to treat a flue gas under the conditions below:
Height of tower: 7 to 11 m
Height of the first stage: about 1 m
Contact time between the flue gas and water: 25 seconds to 1 minutes
Pressure of sea water: 2 to 8 bar
pH of the treated alkaline water: 9.5 to 10
Concentrations of components present in the flue gas: $SO_2$: 10 to 2000 ppm
$NO_x$: 0 to 1000 ppm
$CO_2$: 2 to 7% by volume
Temperature of the flue gas: 100 to 300° C.
Flow rate of the flue gas: approximately 500 to 2500 m³/h
Flow rate of the natural seawater: approximately 10 to 25 m³/h
Flow rate of the treated alkaline water: approximately 5 to 25 m³/h The results of the tests showed that the removal of the gas $SO_2$, $NO_x$ and $CO_2$ are 80%-100%, 60%-80% and 20%-60%, respectively.

Thus, the present invention provides a method and a system which effectively remove the pollutants and greenhouse gases $SO_2$, $NO_x$ and $CO_2$ from a flue gas. The invention is significantly more economical and convenient and does not cause harm to the environments. When compared with the processes and systems in the prior art, the invention exhibits a novel and unique feature that elemental carbon and oxygen are generated as final products and can be recovered as an energy source. The invention not only solves the storage problem associated with the $CO_2$ capturing technologies, but also eliminates the need of using chemicals required in the prior processes and the need of disposal of final products.

Having sufficiently described the nature of the present invention according to some preferred embodiments, the invention, however, should not be limited to the structures and functions of the embodiments and drawings. It is stated that insofar as its basic principle is not altered, changed or modified it may be subjected to variations of detail. Numerous variations and modifications that are easily obtainable by means of the skilled person's common knowledge without departing from the scope of the invention should fall into the scope of this invention.

What is claimed is:

1. A method for removing pollutants and greenhouse gases $SO_2$, $NO_x$, and $CO_2$ from a flue gas stream, comprising:
a) contacting natural seawater with a flue gas in a counter flow, co-current flow or cross flow direction for a given period of time to remove $SO_2$ from the flue gas;
b) contacting treated alkaline water to the flue gas in a counter flow, co-current flow or cross flow direction to remove $CO_2$ and $NO_x$ from the flue gas and generate oxygen and carbon particles; and
c) collecting or emitting the flue gas after operation b).

2. The method according to claim 1, wherein in operation a), the seawater after contacting with the flue gas is controlled to have a pH range of 6.0-7.5.

3. The method according to claim 2, wherein in operation a), the pH of the seawater is in the range of 6.5-7.5.

4. The method according to claim 1, wherein in operation a), the seawater is contacted with the flue gas for a duration of 1-90 seconds.

5. The method according to claim 1, wherein the flue gas entering operation b) is controlled to be less than 70° C.

6. The method according to claim 1, wherein the treated alkaline water is prepared by an alkaline water generator and supplied through pipelines connected to the alkaline water generator.

7. The method according to claim 1, wherein the treated alkaline water is subjected to a time varying low frequency electromagnetic wave treatment.

8. The method according to claim 7, wherein the time varying low frequency electromagnetic wave treatment is applied by use of a device for generating an electromagnetic field which has a varying low frequency.

9. The method according to claim 1, further comprising: recovering the carbon particles and collecting oxygen generated in operation b).

10. The method according to claim 1, wherein the seawater after contacting with the flue gas in operation a) is mixed with the treated alkaline water after contacting with the flue gas in operation b), and the mixture is either re-circulated back to operation a) as a source of water to contact with the flue gas for removing $SO_2$, or directly discharged into the sea without the need of a subsequent treatment thereof.

11. The method according to claim 1, wherein operations a) and b) are repeated for one or more times.

12. A system for removing pollutants and greenhouse gases $SO_2$, $NO_x$, and $CO_2$ from a flue gas stream, comprising: a reactor configured to have at least two stages for removing the pollutants and greenhouse gases from the flue gas, wherein a first stage of the stages includes a first gas inlet for introducing the flue gas to pass upward and through the reactor, and at least one first intake for introducing natural seawater to come into contact with the flue gas in a counter flow, co-current flow or cross flow direction to remove $SO_2$ from the flue gas; and a second stage of the stages includes at least one second intake for introducing treated alkaline water to the flue gas rising upward from the first stage in a counter flow, co-current flow or cross flow direction to remove $CO_2$ and $NO_x$ from the flue gas and generate oxygen and carbon particles.

13. The system according to claim 12, wherein the first stage further comprises one or more sub-stages for enhancing the removing of $SO_2$.

14. The system according to claim 12, wherein the first stage has a height range of 0.8 m-2 m to allow the seawater to come into contact with the flue gas for a given period of time so that a temperature of the flue gas is decreased to less than 70° C. before the flue gas enters the second stage.

15. The system according to claim 12, wherein a device for generating a time varying low frequency electromagnetic field is arranged such that the treated alkaline water is subjected to a time varying low frequency electromagnetic wave treatment before the treated alkaline water is introduced into the second stage of the reactor.

16. The system according to claim 12, further comprising an electrostatic precipitator for recovering the generated carbon particles in the second stage of the reactor.

17. The system according to claim 12, wherein the reactor further comprises a third stage where natural water is used to flush out the carbon particles present in the flue gas after the second stage.

18. The system according to claim 17, wherein a drift eliminator or demister is provided at or after the third stage to remove fine water droplets to produce a final clean gas.

19. The system according to claim 12, wherein all the stages of the reactor are provided in a single reactor or constructed as separate vessels of the reactor in horizontal relation.

20. Use of carbon dioxide or carbonate-based compounds as a source for producing carbon and oxygen, wherein carbon dioxide or the carbonate-based compounds are subjected to the method according to claim 1.

* * * * *